United States Patent
Canzano (10) Patent No.: US 11,398,229 B1
(45) Date of Patent: Jul. 26, 2022

(54) APPARATUS, SYSTEM AND METHOD FOR VOICE-CONTROLLED TASK NETWORK

(71) Applicant: ALLSCRIPTS SOFTWARE, LLC, Chicago, IL (US)

(72) Inventor: Stephen A. Canzano, Cape Coral, FL (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 0 days.

(21) Appl. No.: 16/271,731

(22) Filed: Feb. 8, 2019

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(58) Field of Classification Search
CPC . H04L 12/56; G10L 15/22; G10I 15/30; G10I 15/223
USPC ......................................................... 704/251
See application file for complete search history.

(56) References Cited

U.S. PATENT DOCUMENTS

| | | | |
|---|---|---|---|
| 7,200,210 B2 | 4/2007 | Tang | |
| 7,472,357 B1 | 12/2008 | Satterfield et al. | |
| 7,490,031 B1* | 2/2009 | Qiu | G06F 8/38 703/22 |
| 8,855,143 B1* | 10/2014 | Acampora | H04L 63/1458 709/236 |
| 9,009,592 B2 | 4/2015 | Friend et al. | |
| 9,356,790 B2 | 5/2016 | Zambetti et al. | |
| 9,754,224 B2 | 9/2017 | Bradley et al. | |
| 2007/0168215 A1* | 7/2007 | Tang | G06Q 10/109 379/88.04 |
| 2009/0037362 A1 | 2/2009 | Fox | |
| 2009/0094623 A1 | 4/2009 | Chakra et al. | |
| 2009/0222277 A1 | 9/2009 | Malek et al. | |
| 2012/0035925 A1* | 2/2012 | Friend | G06F 3/167 704/235 |

(Continued)

OTHER PUBLICATIONS

R. V. Cox, C. A. Kamm, L. R. Rabiner, J. Schroeter and J. G. Wilpon, "Speech and language processing for next-millennium communications services," in Proceedings of the IEEE, vol. 88, No. 8, pp. 1314-1337, Aug. 2000, doi: 10.1109/5.880086. (Year: 2000).*

(Continued)

*Primary Examiner* — Bharatkumar S Shah
(74) *Attorney, Agent, or Firm* — Loza & Loza, LLP; Peter Zura (57) ABSTRACT

Technologies and techniques for voice-controlled planning control. A system command manager processes voice commands, and a system planning manager generates a Hierarchical Task Network (HTN) plan and transmitting at least a portion of the HTN plan to a processing device via a communications interface. The system planning manager is configured to generate a task from the HTN plan and determine if a voice command confirmation was received from the processing device in response to the generated task. The system planning manager may then generate a subsequent task from the HTN plan if the voice command confirmation is received from the processing device, and execute a repair process on the HTN plan if the voice confirmation is not received.

20 Claims, 8 Drawing Sheets

(56) References Cited

U.S. PATENT DOCUMENTS

2018/0040319 A1* 2/2018 Rotman .............. G04G 13/026

OTHER PUBLICATIONS

R. V. Cox, C. A. Kamm, L. R. Rabiner, J. Schroeter and J. G. Wilpon, "Speech and language processing for next-millennium communications services," in Proceedings of the IEEE, vol. 88, No. 8, pp. 1314-1337, Aug. 2000, doi: 10.1109/5.880086. (Year: 2000) (Year: 2000).*

R. V. Cox, C. A. Kamm, L. R. Rabiner, J. Schroeter and J. G. Wilpon, "Speech and language processing for next-millennium communications services," in Proceedings of the IEEE, vol. 88, No. 8, pp. 1314-1337, Aug. 2000, doi: 10.1109/5.880086. (Year: 2000) (Year: 2000) (Year: 2000).*

M. D. Johnston and K. J. Rabe, "Integrated planning for telepresence with time delays," 2nd IEEE International Conference on Space Mission Challenges for Information Technology (SMC-IT'06), 2006, p. 7 p. -, doi: 10.1109/SMC-IT.2006.39. (Year: 2006).*

Georgievski et al. "HTN planning: Overview, comparison, and beyond". Artificial Intelligence 222, pp. 124-156 (2015).

Kaldeli et al. "Domain-independent planning for services in uncertain and dynamic environments". Artificial Intellience 236, pp. 30-64 (2016).

Padia et al. "A system for generating storyline visualizations using hierarchical task network planning" Computers & Graphics 78, pp. 64-75 (2019).

Dela Cruz et al. "Typed versus voice recognition for data entry in electronic health records: Emergency Physician time use and interruptions". West J Emerg Med. 15(4): 541-547 (Jul. 2014).

* cited by examiner

APPARATUS, SYSTEM AND METHOD FOR VOICE-CONTROLLED TASK NETWORK

FIELD OF TECHNOLOGY

The present disclosure is directed to technologies and techniques for operating task networks via voice control. More specifically, the present disclosure is directed to voice-controlled hierarchical task networks for use in task-related environments such as medicine or industry.

BACKGROUND

Automated planning and scheduling, sometimes referred to as AI Planning, is a branch of artificial intelligence that concerns the realization of strategies or action sequences, typically for execution by intelligent agents, autonomous robots and unmanned vehicles. Unlike classical control and classification problems, solutions in automated planning and scheduling can be complex and are discovered and optimized in multidimensional space. Conventional planning is also related to decision theory. Processes may include dynamic programming, reinforcement learning and combinatorial optimization. Languages used to d escribe planning and scheduling are often called action languages.

The use of automated planning in less complex environments, specifically those involving human actions, or combinations of machines and human actions has not been extensively explored in the industry. In part, a reason for this is that automated planning has not had effective mechanisms for obtaining feedback that is not cumbersome and/or ineffective for the user. Additionally, conventional automated planning can be computationally expensive, and can often be found lacking when multiple users are involved in the same plan.

SUMMARY

Various apparatus, systems and methods are disclosed herein relating to specialized computer systems for voice-control operation for planning systems.

In some illustrative embodiments, a system is disclosed for voice-controlled planning control, comprising: a microphone for receiving voice commands; a processor for transforming the voice commands to digital data; a memory, operatively coupled to the processor; and a communications interface, operatively coupled to the processor, wherein the communications interface is configured to receive at least a portion of a Hierarchical Task Network (HTN) plan; wherein the processor is configured to generate a task from the received HTN plan and determine if a voice command confirmation was received in response to the generated task, wherein the processor is configured to generate a subsequent task from the HTN plan if the voice command confirmation is received via the microphone, and wherein the processor is configured to execute a repair process on the HTN plan if the voice confirmation is not received.

In some illustrative embodiments, a method is disclosed for operating voice-controlled planning control in a system, comprising: receiving voice commands via a microphone; transforming, via a processor, the voice commands to digital data; a memory, operatively coupled to the processor; receiving, via a communications interface, at least a portion of a Hierarchical Task Network (HTN) plan; generating, via the processor, a task from the received HTN plan and determining if a voice command confirmation was received in response to the generated task, generating, via the processor, a subsequent task from the HTN plan if the voice command confirmation is received via the microphone, and executing, via the processor, a repair process on the HTN plan if the voice confirmation is not received.

In some illustrative embodiments, a system is disclosed for voice-controlled planning control, comprising: a processor; a system command manager for processing voice commands; a communications interface, operatively coupled to the processor; a system planning manager for generating a Hierarchical Task Network (HTN) plan and transmitting at least a portion of the HTN plan to a processing device via the communications interface; wherein the system planning manager is configured to generate a task from the received HTN plan and determine if a voice command confirmation was received from the processing device in response to the generated task, generate a subsequent task from the HTN plan if the voice command confirmation is received from the processing device, and execute a repair process on the HTN plan if the voice confirmation is not received.

BRIEF DESCRIPTION OF THE FIGURES

The present invention is illustrated by way of example and not limitation in the figures of the accompanying drawings, in which like references indicate similar elements and in which.

DETAILED DESCRIPTION

Various embodiments will be described herein below with reference to the accompanying drawings. In the following description, well-known functions or constructions are not described in detail since they may obscure the invention in unnecessary detail.

It will be understood that the structural and algorithmic embodiments as used herein does not limit the functionality to particular structures or algorithms, but may include any number of software and/or hardware components. In general, a computer program product in accordance with one embodiment comprises a tangible computer usable medium (e.g., hard drive, standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Swift, Objective-C, Javascript, CSS, XML, etc.). Furthermore, the term "information" as used herein is to be understood as meaning digital information and/or digital data, and that the term "information" and "data" are to be interpreted as synonymous.

In addition, while conventional hardware components may be utilized as a baseline for the apparatuses and systems disclosed herein, those skilled in the art will recognize that he programming techniques and hardware arrangements disclosed herein, embodied on tangible mediums, are configured to transform the conventional hardware components into new machines that operate more efficiently (e.g., providing greater and/or more robust data, while using less processing overhead and/or power consumption) and/or provide improved user workspaces and/or toolbars for human-machine interaction.

Figure 1:
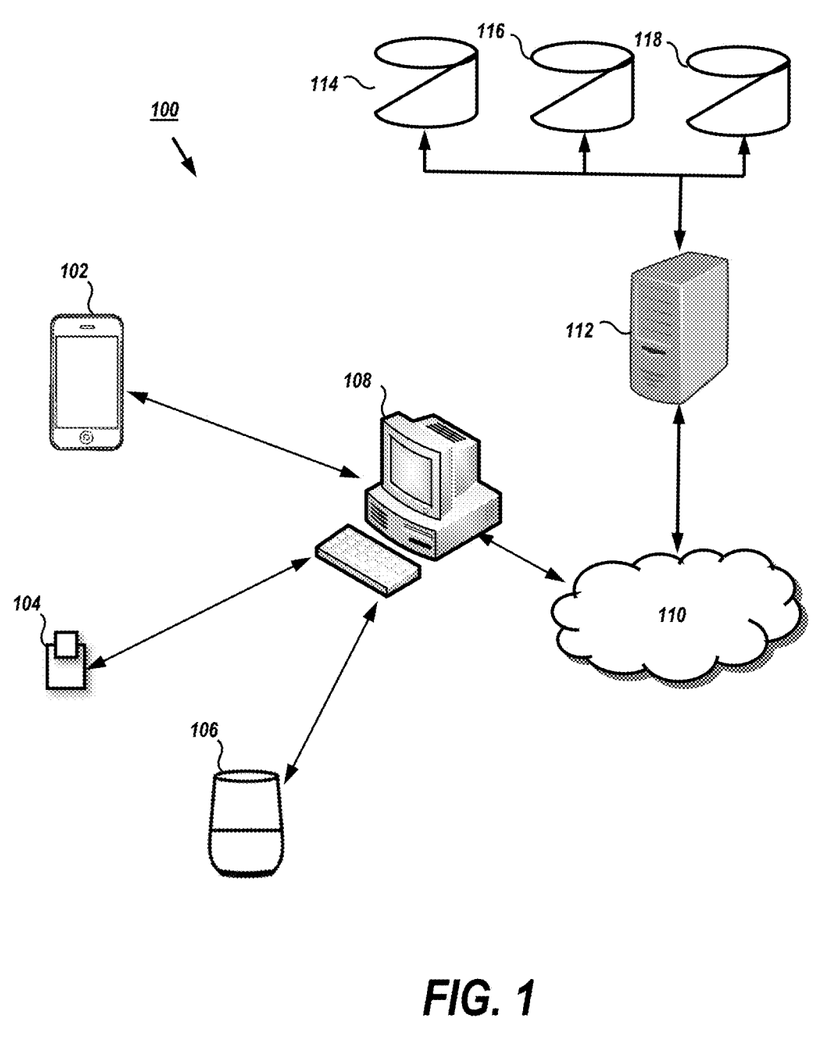
FIG. 1 illustrates a simplified overview of a processor-based computer system configured as a voice-controlled hierarchical task network under an illustrative embodiment.

Turning to FIG. 1, a system 100 is shown for operating a voice-controlled hierarchical task network under an illustrative embodiment. The system 100 may include at least one portable processing device 102, and may also include one or more sensors 104 and/or one or more voice activated devices 106, such as smart speakers or the like. In some illustrative embodiments, devices 102-106 may communicate with one or more computers and/or workstations 108. Those skilled in the art understand that portable processing device 102 and computer 108 may be configured as any suitable device that include, but are not limited to, cell phones, tablets, laptops, personal computers, workstations, medical processing devices, and the like. Portable processing devices 102-108 and computers 108-110 may communicate with each other via a direct wired or wireless connections (e.g., Bluetooth, Wifi), or through a local network (e.g., LAN).

Figure 3:
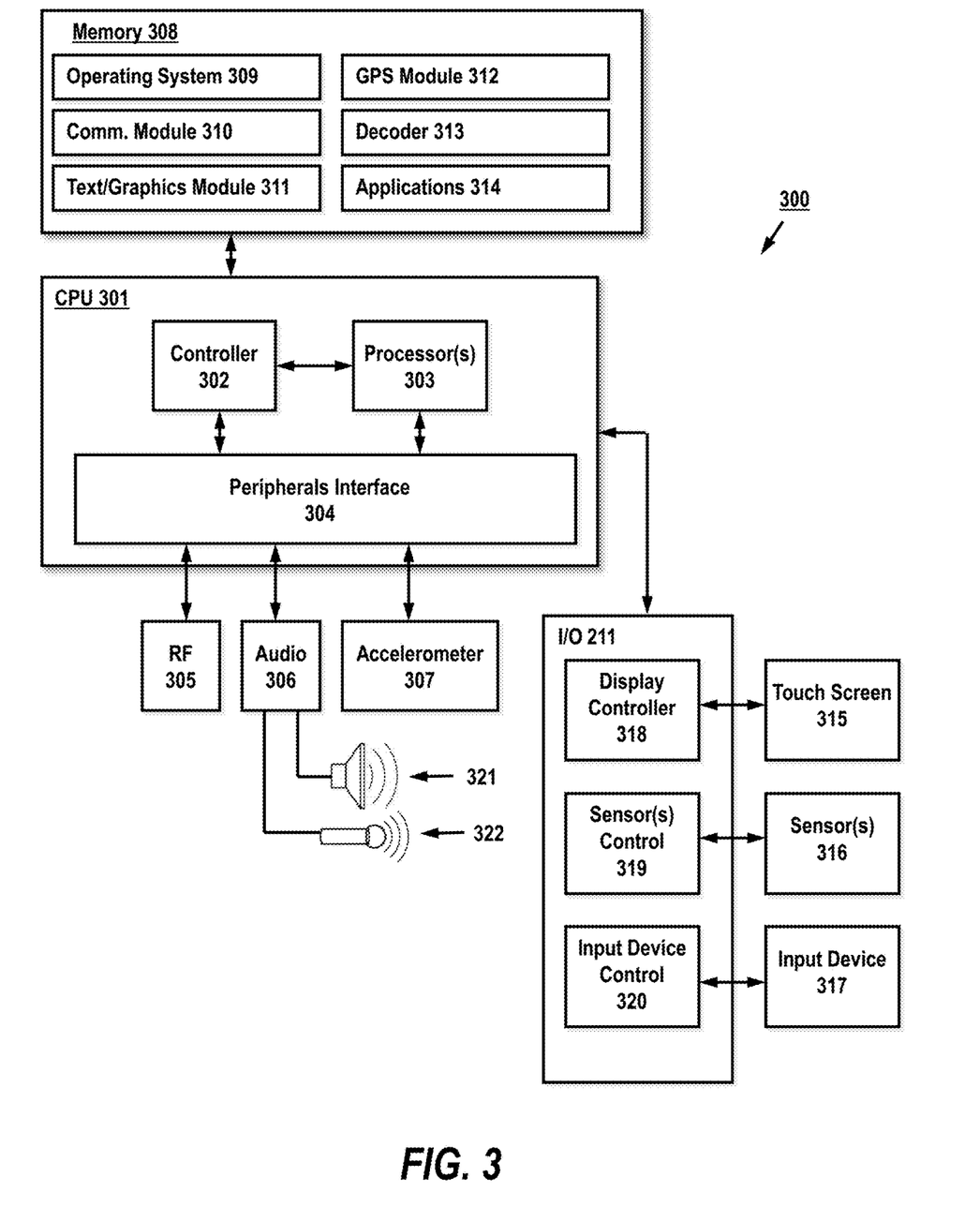
FIG. 3 schematically illustrates an operating environment for a processing device configured to perform voice-controlled hierarchical tasks under an illustrative embodiment.

In one example, portable processing device 102, sensor 104 and voice-activated device 106 may be physically configured in one facility. In another example, portable processing device 102, sensor 104 and voice-activated device 106 may be physically configured in separate locations. In some illustrative embodiments, any of the portable device 102 and sensor 104 may be configured with voice-activation technology. During operation, sound waves may be detected as an analog signal via a microphone (e.g., 322) and an analog-to-digital converter (ADC) (e.g., via audio circuitry 306) translates this analog signal into digital data by sampling the signal at precise measurements of the wave at frequent intervals. The digitized sound is filtered to remove unwanted noise, and to separate it into different bands of frequency. The digitized signal may also be normalized and temporally aligned. Next, the signal may divided into small segments (e.g., milliseconds), where an algorithm may match these segments to known phonemes. A statistical modeling system may then process the data to determine speech recognition. Illustrative models include, but are not limited to, Hidden Markov Model and neural networks. Once the speech is recognized, a voice command module (e.g., 216) translates the command into an executable action, such as executing or modifying data or software, transmitting command and/or data signals, and the like.

Figure 2:
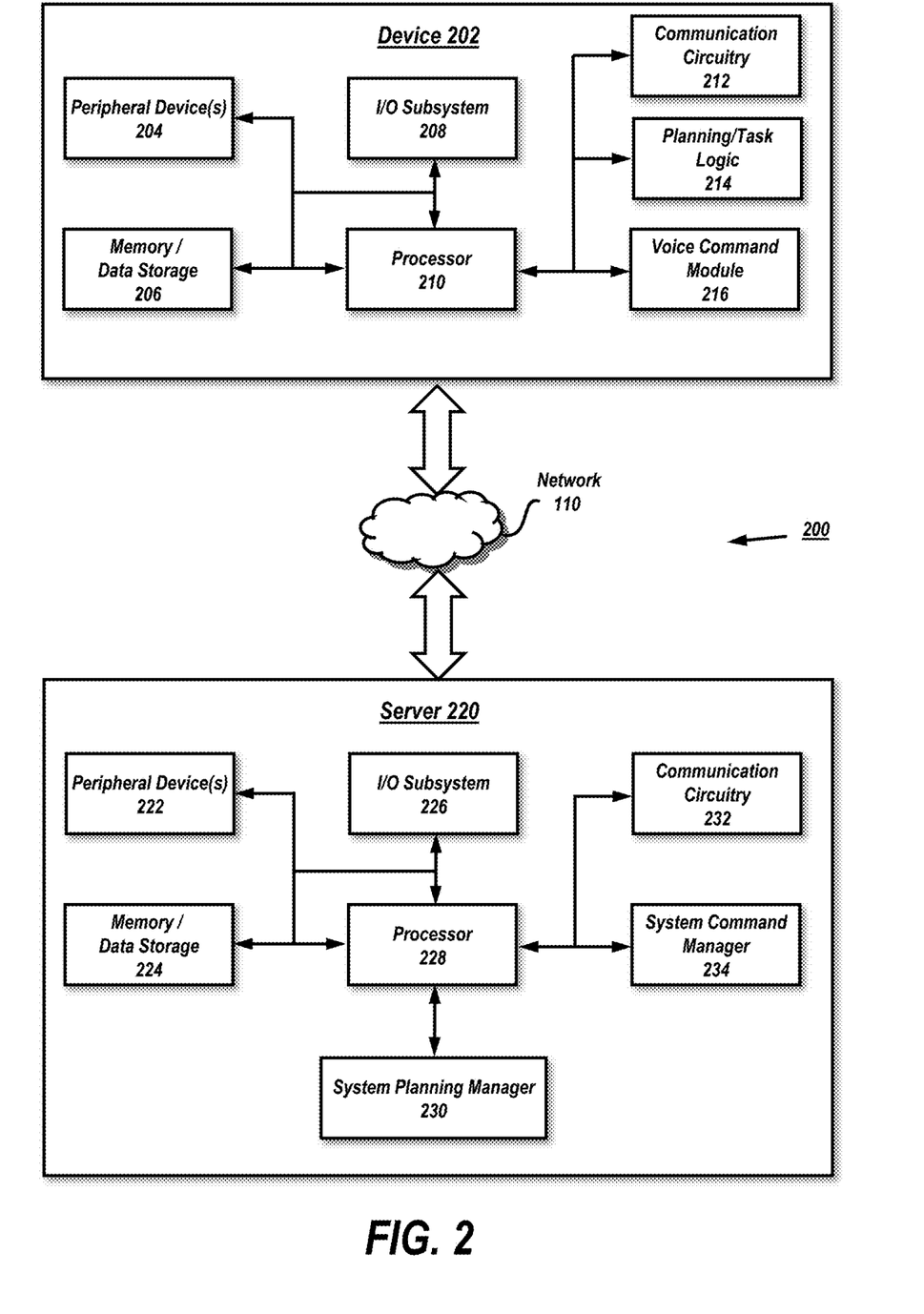
FIG. 2 shows an operating environment for a device and a server in a voice-controlled hierarchical task network environment for processing data under an illustrative embodiment.

The computer 108 may be communicatively coupled to a computer network 110, which is communicatively coupled to one or more servers 112. In the example of FIG. 1, server 112 may be communicatively coupled with a plurality of databases 114, 116, 118. The databases (114-118) may be configured as large-scale databases suitable for use in systems, such as EMRs, EHRs, and the like. In some illustrative embodiments, databases 114-118 may, individually or in combination, store algorithms and/or data relating to voice commands, planning and related tasks and system operations FIG. 2 shows an operating environment 200 for system 100 that includes a processing device 202, which may be configured as any of devices 102-106, and a server 220, which may be configured as server 112, communicating via the network 110 wherein the operating environment is configured to process hierarchical task network (HTN) planning data, as explained in greater detail below. In the illustrative embodiment, the processing device 202 includes a processor 210 or processor circuit, one or more peripheral devices 204, memory/data storage 206, communication circuitry 212, input/output (I/O) subsystem, a planning/task logic module 214 and voice command module 216.

The voice command module 216 of environment 200 may be configured to perform voice command recognition, as discussed above planning/task logic module 214 may be configured to perform aspects of HTN planning. In some illustrative embodiments, voice command module 216 and/or planning/task logic module 214 may be incorporated into memory/data storage 206 with or without a secure memory area, or may be a dedicated component, or incorporated into the processor 210. Of course, processing device 202 may include other or additional components, such as those commonly found in a digital apparatus and/or computer (e.g., sensors, various input/output devices), in other embodiments. Additionally, in some embodiments, one or more of the illustrative components may be incorporated in, or otherwise form a portion of, another component. For example, the memory/data storage 206, or portions thereof, may be incorporated in the processor 210 in some embodiments.

The processor 210 may be embodied as any type of processor currently known or developed in the future and capable of performing the functions described herein. For example, the processor 210 may be embodied as a single or multi-core processor(s), digital signal processor, microcontroller, or other processor or processing/controlling circuit. Similarly, memory/data storage 206 may be embodied as any type of volatile or non-volatile memory or data storage currently known or developed in the future and capable of performing the functions described herein. In operation, memory/data storage 206 may store various data and software used during operation of the processing device 210 such as access permissions, access parameter data, operating systems, applications, programs, libraries, and drivers.

Memory/data storage 206 may be communicatively coupled to the processor 210 via an I/O subsystem 208, which may be embodied as circuitry and/or components to facilitate input/output operations with the processor 210, memory/data storage 206, and other components of the processing device 202. For example, the I/O subsystem 208 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 208 may form a portion of a system-on-a-chip (SoC) and be incorporated, along with the processor 210, memory/data storage 206, and other components of the processing device 202, on a single integrated circuit chip.

The processing device 202 includes communication circuitry 212 (communication interface) that may include any number of devices and circuitry for enabling communications between processing device 202 and one or more other external electronic devices and/or systems. Similarly, peripheral devices 204 may include any number of additional input/output devices, interface devices, and/or other peripheral devices. The peripheral devices 204 may also include a display, along with associated graphics circuitry and, in some embodiments, may further include a keyboard, a mouse, audio processing circuitry (including, e.g., amplification circuitry and one or more speakers), and/or other input/output devices, interface devices, and/or peripheral devices.

The server 220 may be embodied as any suitable server (e.g., a web server, etc.) or similar computing device capable of performing the functions described herein. In the illustrative embodiment of FIG. 2 the server 220 includes a processor 228, an I/O subsystem 226, a memory/data storage 224, communication circuitry 232, and one or more peripheral devices 222. Components of the server 220 may be similar to the corresponding components of the processing device 202, the description of which is applicable to the corresponding components of server 220 and is not repeated herein for the purposes of brevity.

The communication circuitry 232 of the server 220 may include any number of devices and circuitry for enabling communications between the server 220 and the processing device 202. In some embodiments, the server 220 may also include one or more peripheral devices 222. Such peripheral devices 222 may include any number of additional input/output devices, interface devices, and/or other peripheral devices commonly associated with a server or computing device. In some illustrative embodiments, the server 220 also includes system learning manager 230 and system command manager 234. System command manager 234 may be configured to invoke and/or control voice commands within the system. System planning manager 230 may comprise intelligence circuitry and/or modules that communicates via the system (e.g., 100) to planning/task modules (e.g., 214) and perform system-wide planning, as discussed herein. As discussed in more detail below, "plan" or "planning" as used herein is defined by a search problem over states that can be structured and/or expressed as logical formulas.

In some illustrative embodiments, system command manager module 234 may be operatively coupled to system planning manager module 230, where system planning manager module 230 comprises a plurality of HTN plans comprising a plurality of tasks, where system command manager module 234 may provide voice-activated commands, feedback and/or data that may control operation of system planning manager module 230. During operation, the environment 200 allows the system (e.g., 100) to activate a HTN plan via voice recognition, and transmit the plan, including one or more plan steps (tasks) to one or more devices (e.g., 102-108). As each task is performed, the system may receive voice-controlled feedback from a device, either confirming a performed step and/or providing new or modified commands relative to the plan. In some examples, a plan may involve different feedback from multiple devices (e.g., 102, 106) and may also include sensor data (e.g., from sensor 104). Depending on this feedback, the system may modify a plan (e.g., via system planning manager 230) and transmit new plan steps (tasks) out to the one or more devices.

Those skilled in the art will appreciate that the configurations disclosed herein provide improved technical solutions to conventional plan systems to provide improved systems operations. By utilizing HTN planning combined with voice-control, the present disclosure provides a system that frees up local resources by providing back-end HTN processing, and allows one or more users to provide vocal feedback in real-time to establish more accurate and/or relevant tasks. Such configurations are also advantageous in areas where users may be inconvenienced by, or not have the ability to interface directly with a device via an I/O device (e.g., keyboard, touchscreen, etc.).

Continuing with the illustrated embodiment of FIG. 2, communication between the server 220 and the processing device 202 takes place via the network 106 that may be operatively coupled to one or more network switches (not shown). In one embodiment, the network 106 may represent a wired and/or wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). Generally, the communication circuitry of processing device 202 and the communication circuitry 232 of the server 220 may be configured to use any one or more, or combination, of communication protocols to communicate with each other such as, for example, a wired network communication protocol (e.g., TCP/IP), a wireless network communication protocol (e.g., Wi-Fi, WiMAX), a cellular communication protocol (e.g., Wideband Code Division Multiple Access (W-CDMA)), and/or other communication protocols. As such, the network 106 may include any number of additional devices, such as additional computers, routers, and switches, to facilitate communications between the processing device 202 and the server 220.

FIG. 3 is an exemplary embodiment of a computing device 300 (such as processing devices 102, 108), and may be a personal computer, smart phone, tablet computer, laptop and the like. Device 300 may include a central processing unit (CPU) 301 (which may include one or more computer readable storage mediums), a memory controller 302, one or more processors 303, a peripherals interface 304, RF circuitry 305, audio circuitry 306, accelerometer 307, speaker 321, microphone 322, and input/output (I/O) subsystem 221 having display controller 318, control circuitry for one or more sensors 319 and input device control 320. These components may communicate over one or more communication buses or signal lines in device 300. It should be appreciated that device 300 is only one example of a portable multifunction device, and that device 300 may have more or fewer components than shown, may combine two or more components, or a may have a different configuration or arrangement of the components. The various components shown in FIG. 3 may be implemented in hardware or a combination of hardware and software, including one or more signal processing and/or application specific integrated circuits.

Memory (or storage) 308 may include high-speed random access memory (RAM) and may also include non-volatile memory, such as one or more magnetic disk storage devices, flash memory devices, or other non-volatile solid-state memory devices. Access to memory 308 by other components of the device 300, such as processor 303, and peripherals interface 304, may be controlled by the memory controller 302. Peripherals interface 304 couples the input and output peripherals of the device to the processor 303 and memory 308. The one or more processors 303 run or execute various software programs and/or sets of instructions stored in memory 308 to perform various functions for the device 300 and to process data. In some embodiments, the peripherals interface 304, processor(s) 303, decoder 313 and memory controller 302 may be implemented on a single chip, such as a chip 301. In other embodiments, they may be implemented on separate chips.

RF (radio frequency) circuitry 305 receives and sends RF signals, also known as electromagnetic signals. The RF circuitry 305 converts electrical signals to/from electromagnetic signals and communicates with communications networks and other communications devices via the electromagnetic signals. The RF circuitry 305 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 305 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 306, speaker 321, and microphone 322 provide an audio interface between a user and the device 300. Audio circuitry 306 may receive audio data from the peripherals interface 304, converts the audio data to an electrical signal, and transmits the electrical signal to speaker 321. The speaker 321 converts the electrical signal to human-audible sound waves. Audio circuitry 306 also receives electrical signals converted by the microphone 321 from sound waves, which may include utterances from a speaker. The audio circuitry 306 converts the electrical signal to audio data and transmits the audio data to the peripherals interface 304 for processing. Audio data may be retrieved from and/or transmitted to memory 308 and/or the RF circuitry 305 by peripherals interface 304. In some embodiments, audio circuitry 306 also includes a headset jack for providing an interface between the audio circuitry 306 and removable audio input/output peripherals, such as output-only headphones or a headset with both output (e.g., a headphone for one or both ears) and input (e.g., a microphone).

I/O subsystem 221 couples input/output peripherals on the device 300, such as touch screen 315, sensors 316 and other input/control devices 317, to the peripherals interface 304. The I/O subsystem 221 may include a display controller 318, sensor controllers 319, and one or more input controllers 320 for other input or control devices. The one or more input controllers 320 receive/send electrical signals from/to other input or control devices 317. The other input/control devices 317 may include physical buttons (e.g., push buttons, rocker buttons, etc.), dials, slider switches, joysticks, click wheels, and so forth. In some alternate embodiments, input controller(s) 320 may be coupled to any (or none) of the following: a keyboard, infrared port, USB port, and a pointer device such as a mouse, an up/down button for volume control of the speaker 321 and/or the microphone 322. Touch screen 315 may also be used to implement virtual or soft buttons and one or more soft keyboards.

Touch screen 315 provides an input interface and an output interface between the device and a user. Display controller 318 receives and/or sends electrical signals from/to the touch screen 315. Touch screen 315 displays visual output to the user. The visual output may include graphics, text, icons, video, and any combination thereof. In some embodiments, some or all of the visual output may correspond to user-interface objects. Touch screen 315 has a touch-sensitive surface, sensor or set of sensors that accepts input from the user based on haptic and/or tactile contact. Touch screen 315 and display controller 318 (along with any associated modules and/or sets of instructions in memory 308) detect contact (and any movement or breaking of the contact) on the touch screen 315 and converts the detected contact into interaction with user-interface objects (e.g., one or more soft keys, icons, web pages or images) that are displayed on the touch screen. In an exemplary embodiment, a point of contact between a touch screen 315 and the user corresponds to a finger of the user. Touch screen 215 may use LCD (liquid crystal display) technology, or LPD (light emitting polymer display) technology, although other display technologies may be used in other embodiments. Touch screen 315 and display controller 318 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 315.

Device 300 may also include one or more sensors 316. Sensors 316 may also include additional sensors, such as heart rate sensors, touch sensors, optical sensors that comprise charge-coupled device (CCD) or complementary metal-oxide semiconductor (CMOS) phototransistors. The optical sensor may capture still images or video, where the sensor is operated in conjunction with touch screen display 315. Device 300 may also include one or more accelerometers 307, which may be operatively coupled to peripherals interface 304. Alternately, the accelerometer 307 may be coupled to an input controller 320 in the I/O subsystem 221. The accelerometer is preferably configured to output accelerometer data in the x, y, and z axes.

In some illustrative embodiments, the software components stored in memory 308 may include an operating system 309, a communication module 310, a text/graphics module 311, a Global Positioning System (GPS) module 312, decoder 313 and applications 314. Operating system 309 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 310 facilitates communication with other devices over one or more external ports and also includes various software components for handling data received by the RF circuitry 305. An external port (e.g., Universal Serial Bus (USB), Firewire, etc.) may be provided and adapted for coupling directly to other devices or indirectly over a network (e.g., the Internet, wireless LAN, etc.).

Text/graphics module 311 includes various known software components for rendering and displaying graphics on the touch screen 315, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 312 determines the location of the device and provides this information for use in various applications. Applications 314 may include various modules, including health monitoring software, sensor software, navigation software, mapping, address books/contact list, email, instant messaging, and the like. In some illustrative embodiments, Applications 314 may communicate with sensors 316, configured as a biometric capture device.

Figure 4:
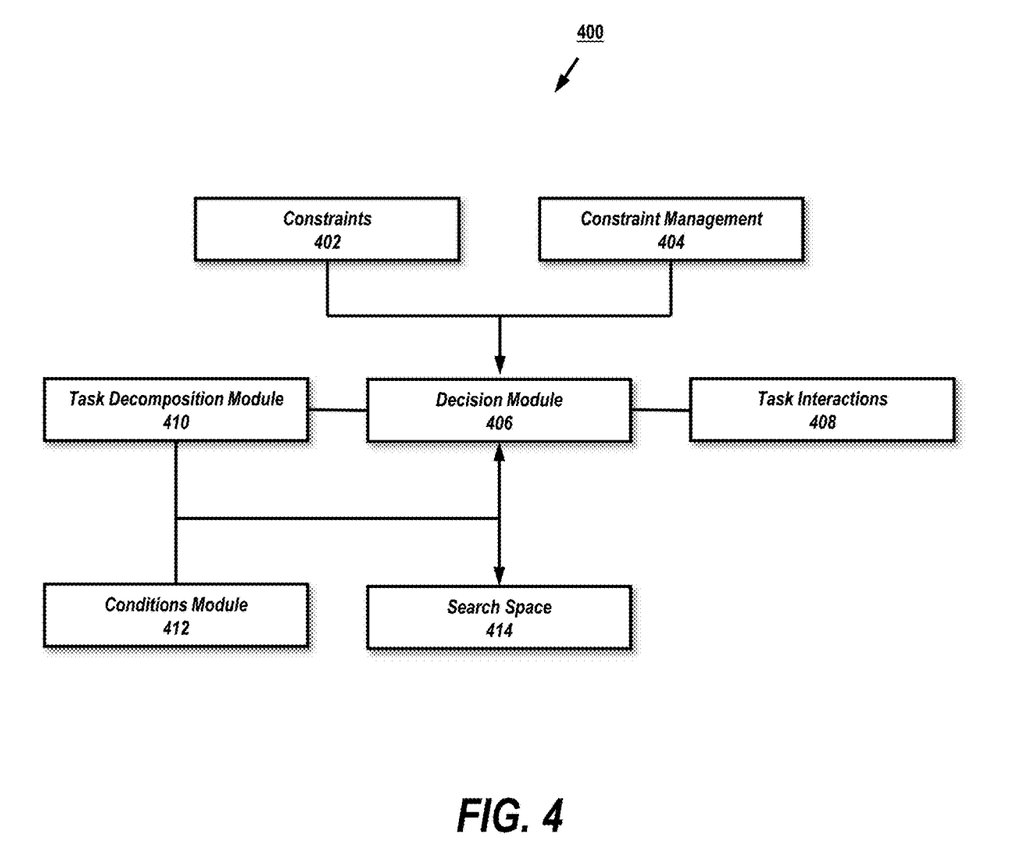
FIG. 4 shows an operating environment for a hierarchical task network framework under an illustrative embodiment.

FIG. 4 shows an operating environment 400 for a hierarchical task network framework under an illustrative embodiment. The operating environment 400 may be embodied as part of the system planning manager 230, and/or planning/task logic module 214. The operating environment may comprise a framework that includes a planning language, tasks, operators, task networks, methods, planning problems and solutions. The HTN planning language may be configured as a first-order language that contains several mutually disjoint sets of symbols. A predicate, which can be configured as a logic true or false, may comprise a finite set of predicate symbols, and a list of terms being either a constant symbol or a variable symbol. Primitive tasks may be defined by a finite set of primitive task symbols, and terms, where primitive tasks may be represented by a planning operator.

An operator may be defined as a triple having a primitive task, preconditions and effects. Preconditions may be denoted by positive and/or negative preconditions. A transition from a state to another may be accomplished by an instance of an operator whose precondition is a logical consequence of a current state. A compound task may be defined by a finite set of compound-task symbols and terms. Task names may be defined by a union of sets of primitive and compound tasks. The task network may be defined as a pair having a finite set of tasks and one or more sets of constrains. Constrains may specify restrictions over each task that must be satisfied during the planning process and by the solution. An HTN planning problem may be defined as a tuple having a finite set of predicates, operators, methods, initial task network and/or initial states.

Still referring to FIG. 4, the operating environment 400 comprises a constrains module 402 and a constraint management module 404 coupled to a decision module 406, which in turn receives data from task interactions module 408. A conditions module 412 produces data for task decomposition module 410, which is also communicatively coupled to decision module 406. Data from conditions module 412 also may be utilized to affect search space 412, along with decision module 406, as shown in the figure. Given a particular task network, task decomposition module 410 may choose a task and, if the task is primitive and suitable for a current state, apply the task to the state. Otherwise, all the methods are analyzed that contain the task as a part of their definition. Assuming that a set of methods is found, a non-deterministic choice of a method is made, and the task is replaced with the task network associated with the method. The newly composed task network may then checked against any constraint-related violation and modified, if necessary.

Task decompositions for module 410 may be divided into a plurality of styles based on the representation of task networks in terms of task ordering, and the way of forming new task networks during decomposition. One style is totally ordered task decomposition (TOTD). In this example, TOTD follows the assumption of total order on task networks so as when a task is decomposed, the new task network is created in such a way that newly added tasks are totally ordered among each other and with respect to the tasks of the existing task network. Another style is unordered task decomposition (UTD) that is configured to relax the requirement of totally ordered task networks, where tasks can be totally ordered or unordered with respect to each other, but no tasks in parallel may be allowed. When a task is decomposed, new task networks are created in such a way that newly added tasks are interleaved with the tasks of the existing task network until all permissible permutations are exhausted. Yet another style is partially ordered task decomposition (POTD) that is configured to allow the existence of a partial order on tasks. When a task is decomposed, the tasks in the newly created network can be ordered in parallel whenever possible, with respect to the constraints.

Constrains module 402 may comprise predetermined constraints for a task network, and/or may comprise constraints added during the planning process in order to resolve inconsistencies. The operating environment 400 may interpret the constraints (e.g., via constraint management module 404) in a plurality of manners. One may be configured to meet a constraint that implies commitments about partial descriptions of state objects. Another type of constraint may be configured to refine variable bindings if a certain variable binding does not satisfy some condition. Alternately or in addition, a constraint may be configured to expresses the relations between variables in different parts of a task network.

Operating environment 400 may further be configured to utilize a plurality of strategies for when and how to make decisions (e.g., via decision module 406). One strategy manages constraints in compliance with a least-commitment strategy so that task ordering and variable bindings are deferred until a decision is forced. Another strategy handles constraints according to an early-commitment strategy so that variables are bound and operators in the plan are totally ordered at each step of a planning process. This strategy may provide advantageous benefit the possibility of adopting forward chaining where chaining of operators is achieved by imposing a total order on plan tasks. The total ordering may be configured to ensure that neither a current task to be added to the plan can interfere with some earlier operator's preconditions or effects, nor a later operator can interfere with current task's preconditions or effects.

Task interaction in operating environment 400 via module 408 may be configured as dependent on the commitment strategy chosen in decision module 406. Generally, an interaction may be viewed as a connection between two tasks, or parts of tasks of a task network in which these tasks have some effect on each other. Decision module 406 may be configured to adapt to harmful interactions (threats or flaws) to avoid conflicts among different parts of a task network that threaten its proper operation. Harmful interactions may include, but are not limited to, deleted-condition interaction, which appears when a primitive task in one part of a task network deletes an expression that is a precondition to a primitive task in another part of that task network, double-cross interaction, which appears when an effect of each of two conjunctive primitive tasks deletes a precondition for the other (e.g., an effect of the first task deletes a precondition of the second primitive task, and an effect of the second task deletes a precondition of the first task). Another harmful interaction includes resource interaction, which may involve resource-resource interaction, similar to the deleted-condition interaction, and a resource-argument interaction, where a resource in one part of a task network is used as an argument in another part of that task network.

Decision module 406 may also be configured to engage in complementary interactions, which involves operational situations when one part of a task network can make use of information associated with another part in the same task network. The detection of these interactions by decision module 406 may provide the operating environment 400 with the ability to generate better-quality task networks and solutions. In some illustrative embodiments, decision module 406 may be configured to merge tasks together to avoid or eliminate task redundancy and optimize cost of the HTN system. Complimentary interactions may include, but are not limited to, placeholder replacement, in which a real value already exists for a particular formal object, and the HTN planner allow tasks with variables to be inserted into a task network. If there is no specific value to be chosen for a particular variable choice, a formal object may be created to bind the variable and serve as a placeholder for some to-be-defined entity. Phantomization is a complimentary interaction when some goal is already true at a point in a task network where it occurs; if some task precondition is not satisfied, it is inserted as a goal to be achieved. Disjunct optimization is a complimentary interaction that may appear in disjunctive goals when one disjunctive goal is "superior" to the others by the nature of its interaction with the other tasks in a task network.

Regarding constraint management module 404, task interactions can be solved by posting various types of constraints onto a task network. This constraint posting may be configured as conflict resolution among interactions. Constraint satisfaction is used to address issues when the HTN planner searches for a variable binding that satisfies the given constraints, and guarantees the consistency of, for example, a set of ordering constraints over a task network. Constraint propagation enables adding or retracting constraints to and from a task network. Variable constraints in one part of a task network can be propagated based on variable constraints in another part of that task network. With respect to ordering constraints, propagation is used when a linking process is performed. When some task interferes with another task, the linking process records a causal link that may comprise a three-element structure of two pointers to specific tasks, and a predicate that is both an effect of one task and a precondition of another. The phantomization interaction is practically achieved by the linking process. Thus, phantomization of a task with an effect may be accomplished by treating the effect as achieved, and finding an existing task t in the task network that achieves the same effect. If task t is found, a constraint may be is added to the task network to record the causal relation.

Conditions module 412 may comprise a plurality of explicit conditions that may be used to increase the quality of the domain knowledge to restrict and guide searches in search space 414. In one example, a supervised condition may be effected in conditions module 412 for compound tasks. Under a supervised condition, a condition may be satisfied either by an intentional insertion of a relevant effect earlier in the processing of the task network, or by an explicit introduction of a primitive task that will achieve the required effect. Generally, this condition may allow further decompositions to be made and, since it may be included for the achievement of the condition invocation of another task, this condition corresponds to preconditions in planning systems, such as those used in a STRIPS operating environment. An external condition may be used for a required task, under the assumption that it is satisfied by some other task from the task network. An external condition can be seen as a sequencing constraint.

A filter condition used in conditions module 412 may decide on tasks relevance to a particular situation. In the case of method relevance to a certain task decomposition, this condition reduces the branching factor by eliminating inappropriate methods. A query condition may be configured to accomplish queries about variable bindings or restrictions at some required point in a task network operating environment (e.g., 400). A compute condition may be utilized in conditions module 412 and may be configured to satisfy conditions by information coming only from external systems, such as a database (e.g., 114-118). An achievement condition for conditions module 412 allows expressing goals that can be achieved by any means available to a planner.

Regarding search space 414, the operating environment 400 may be configured to execute HTN planning for a problem P, where, at the beginning of the search, a task decomposition is imposed on the initial task network, and the process continues by repeatedly decomposing tasks from a newly created task network until a primitive task network is produced. A linearization of this primitive task network executable in the initial state. The search space 414 may also comprise subsets of the state space, where subsets comprise explicitly described states restricted by task decompositions. As in a conventional state space, a search may begin with an empty plan, but instead of searching for a state that will satisfy the goal, the search is for a state that will accomplish a decomposition of the initial task network. In particular, if a task from the task network is compound, the task decomposition continues on the next decomposition level, but in the same state. If the task is primitive, it is executed and the search continues into a successor state. This task is then added to the plan. When there are no more tasks in the task network to be decomposed, the search is finished. The solution then becomes a plan containing a sequence of totally ordered primitive tasks.

Figure 5:
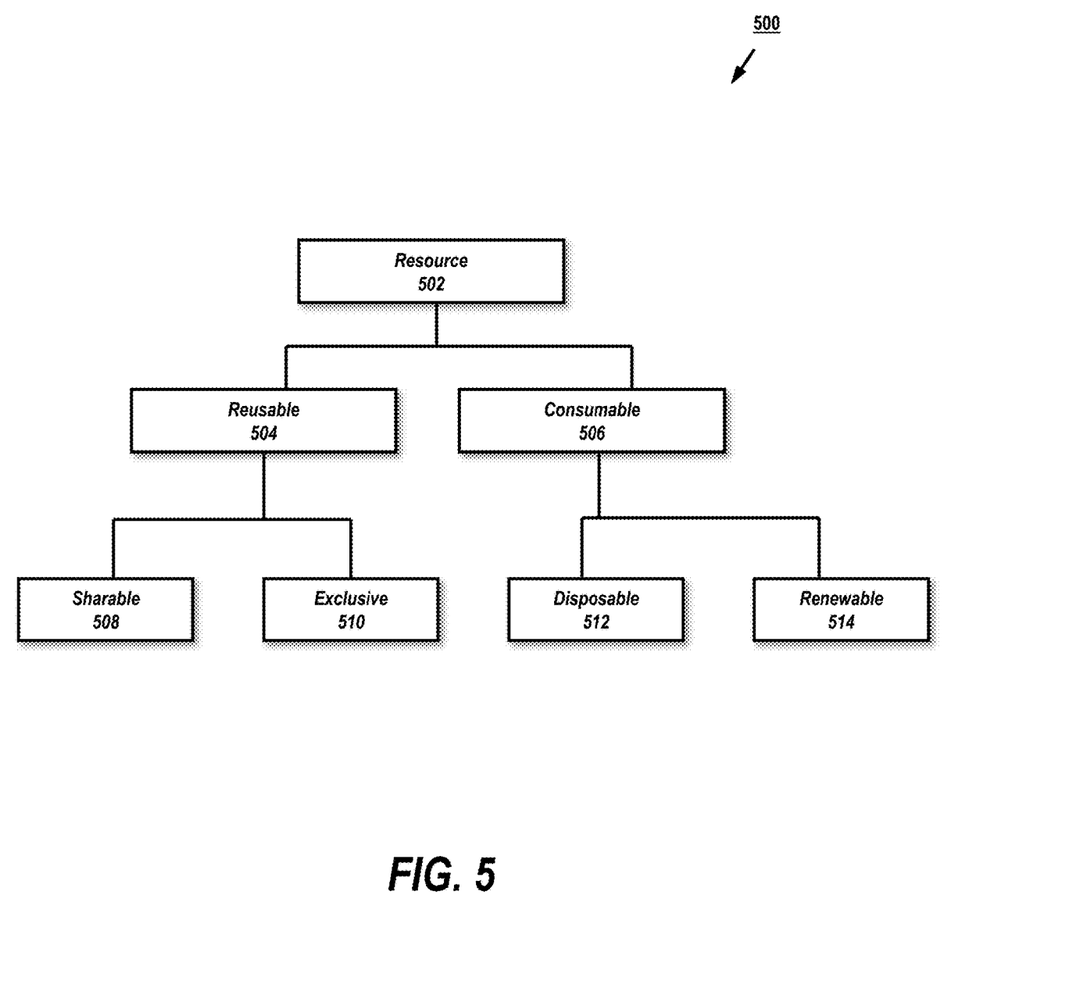
FIG. 5 shows a resource hierarchy for the hierarchical task network under an illustrative embodiment.

FIG. 5 shows a resource hierarchy 500 for the hierarchical task network (100, 400) under an illustrative embodiment. The resource hierarchy may be implemented on any suitable HTN planning platform, such as SIPE-2, UMCP, SHOP2, PANDA, HTNPlan-P, SIADEX and the like. Typically, given a particular planning problem for HTN planning, a resource 500 may be an object of limited capacity for use by a task within the problem. The capacity may be configured as a categorical value that may be binary (e.g., free-to-use vs. used) or may be assigned a numerical value for the resource (502). In some illustrative embodiments, a resource 502 may be configured under a hierarchy to enable planning tasks to consume resources in parallel to provide robustness and efficiency within the system. As can be seen in the figure, a resource 502 may be hierarchically configured to comprise one of a reusable resource 504 or consumable resource 506. When a resource is reusable, it can be used more than once. Thus, a shared reusable resource 508 can be shared among several tasks at the same time, while an exclusively reusable resource 510 cannot be used by two tasks in parallel. A resource is consumable (506) if it is usable only a limited number of times. A consumable resource can be replenished or not. If the resource cannot be restored after the use of the set amount, it is configured as a disposable consumable resource 512. If the resource amount can be replenished, it is designated a renewable consumable resource.

Figure 6:
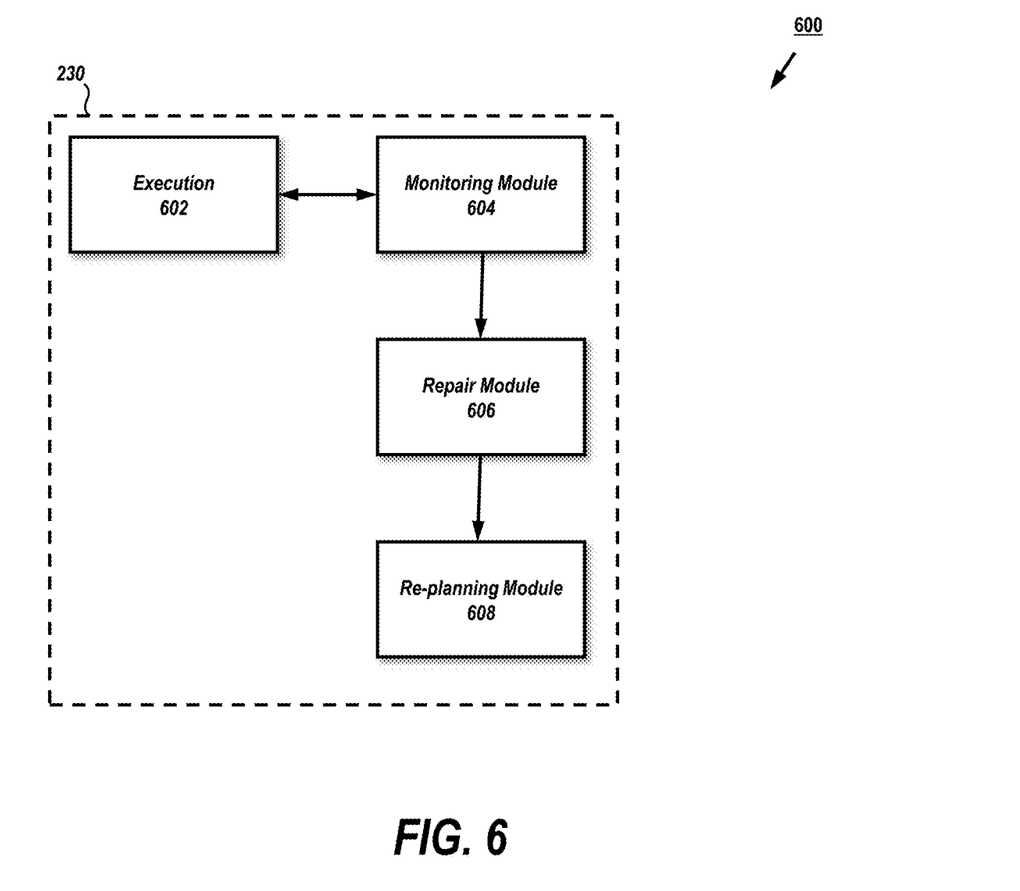
FIG. 6 shows a hierarchical task network fault-tolerance and monitoring architecture under an illustrative embodiment.

FIG. 6 shows a hierarchical task network fault-tolerance and monitoring architecture 600 under an illustrative embodiment. In this example, the architecture 600 may be embodied as part of system planning manager 230. During operation, an HTN planner may be configured to monitor the execution of plans, recognize faults, and process them accordingly. After a planner (e.g., 230, 400) receives a planning problem, a solution plan is computed and executed in execution module 602 (which may be configured in processor(s) 210, 228). Monitoring module 604 monitors the actions and processes the observations of the actual resulting state by comparing them with the expectations made during planning. If some discrepancy is recognized, a fault may be generated and provided to repair module 606, which repairs the current plan. Otherwise the system may require a voice input from the user, and, if the voice input provides a command, the re-planning module 608 re-plans a modified HTN planning problem.

Figure 7A:
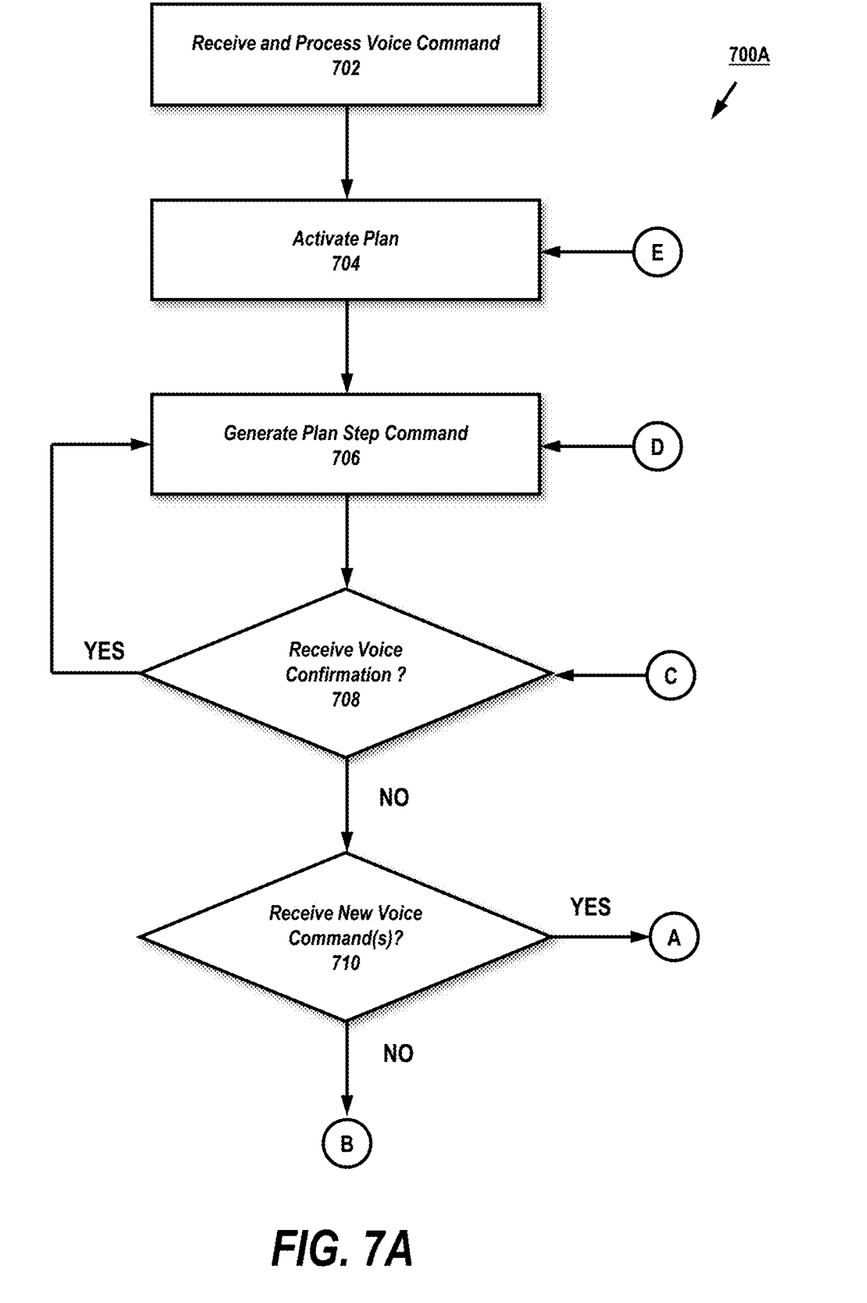
FIGS. 7A-7B show a process for executing voice-controlled hierarchical task network processing under an illustrative embodiment.
Figure 7B:
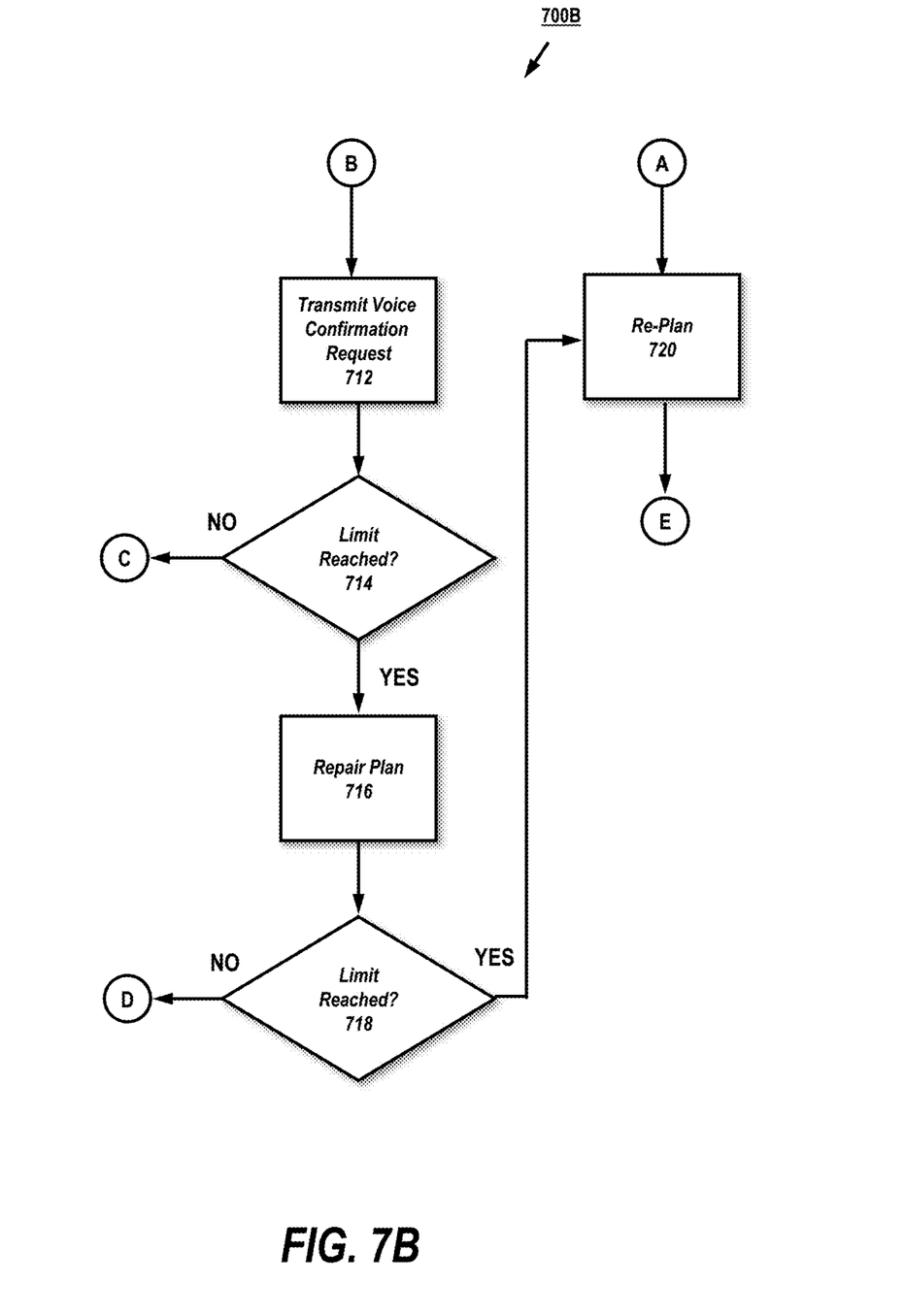

FIGS. 7A-7B show a process (700A, 700B) for executing voice-controlled hierarchical task network processing under an illustrative embodiment. In block 702, the system (e.g., 100) receives, via a processing device (e.g., 102-108) a voice command that is processed and used to initiate an HTN plan, where, in block 704 the system activates the plan and generates a plan step command in block 706. Each of the generated plan step command may comprise a task including one of a plurality of computer-activated functions that may further include audio and/or visual indicia, indicating to the user via the processing device that the function is being processed, and/or that user action and confirmation is required. In decision block 708, the system determines if a voice confirmation is received, where, if the voice confirmation is received ("YES"), the process moves to block 706, where the next plan step is generated, and voice confirmation may be again required in decision block 708. In an illustrative embodiment, provided that voice confirmation is received after certain generated step commands, the process of FIGS. 7A-7B ends.

If, however, a voice confirmation is not received ("NO") in decision block 708, the process moves to decision block 710, where the system detects whether a new voice command was received. In this example, a new voice command can be a single command or a plurality of command that are not confirmation commands. In some illustrative embodiments, a new voice command may comprise a negative confirmation voice command, followed by one or more new commands that are processed to determine if the new commands match a predetermined command set for identifying a re-plan condition.

If such voice command(s) is received ("YES") in decision block 710, the process proceeds ("A") to block 720 of FIG. 7B, wherein the HTN planner re-plans the process. As a simplified example, if P represents an HTN planning problem, and sol=$x_1 \ldots x_n$ is the solution to P, where $s_0[sol]=s_n$. Letting $sol_e$ be the partially executed part of sol, and $sol_r$ being the remaining part to be executed, the execution of sol is in a current state s if $s[sol_e]=s_n$. A fault f is a state transition $s[f]=s'$ such that $f \not\equiv 0$ and $s'[sol_e] \neq s_n$. The fault set may be denoted as F. Thus, the HTN planner may be configured to tolerate faults from a fault set F during the execution of sol if, for each f∈F, there exists a sequence of operators $sol_{f'}$ such that $sol_{f'}$ is a solution to P. After re-planning is performed in block 720, the process returns ("E") to block 704, where the process activates the new plan as described above.

If such voice command(s) is not received ("NO") in decision block 710, the process proceeds ("B") to block 712, where the system transmits a voice confirmation request to the user, and the system determines if a voice confirmation request limit is reached in decision block 714. If the limit is not reached ("NO"), the process proceeds ("C") back to decision block 708, where the system determines if voice confirmation was received in response to the request. The process then proceeds as shown in the figure and as described above, and may repeat until a voice confirmation request limit is reached ("YES") in decision block 714, the process moves to block 716, wherein the system repairs the plan utilizing an orchestration algorithm, such as that described in Kaldeli, E., Lazovik, A., & Aiello, M. *Domain-independent planning for services in uncertain and dynamic environments. Artificial Intelligence*, 236, 30-64 (2016). In some illustrative embodiments, the system may be configured with a repair limit, where, in decision block 718, the system determines if the repair limit is reached. If not ("NO"), the process moves ("D") to block 706 where the system generates a step command for the repaired pan, and continues through the process as shown in the figure and described above. If, in decision block 718 the system determines that the repair limit is reached ("YES") the process moves to block 720 to preform re-planning.

It should be appreciated by those skilled in the art that the present disclosure provides a robust artificial intelligence system that utilizes voice activated input and voice technology for improved operation. Instead of utilizing general-purpose schedulers, the preset disclosure provides an HTN planner configuration that allows a system to process and generate tasks for given problems and receive voice feedback (confirmation) during execution. This in turn allows the system to repair and/or re-plan the planner during execution of the plan. Additionally, the present configuration may be advantageous for plans being operated for multiple users and or facilities (e.g., multiple systems 100) in which a plan requires the input of multiple entities during operation.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. It is understood by those skilled in the art that the present disclosure do The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for voice-controlled planning control, comprising:
    a microphone for receiving voice commands;
    a processor for transforming the voice commands to digital data;
    a memory, operatively coupled to the processor; and
    a communications interface, operatively coupled to the processor, wherein the communications interface is configured to receive at least a portion of a Hierarchical Task Network (HTN) plan comprising device feedback and sensor data, wherein the HTN plan comprises operators having primitive tasks and compound tasks subjected to configured constraints;
    wherein the processor is configured to generate a task from the received HTN plan and determine if a voice command confirmation was received in response to the generated task,
    wherein the processor is configured to generate a subsequent task from the HTN plan if the voice command confirmation is received via the microphone, and
    wherein the processor is configured to execute a repair process on the HTN plan via an orchestration algorithm if the voice command confirmation is not received.

2. The system of claim 1, wherein the processor is configured to execute a re-plan process on the HTN plan if the voice command confirmation is not received via the microphone, and if a new voice command is received via the microphone.

3. The system of claim 2, wherein the processor is configured to execute the re-plan process by determining one or more solutions relating to a remaining portion of the plan based on a current state.

4. The system of claim 1, wherein the HTN plan comprises a plurality of task resources, configured in a hierarchical structure.

5. The system of claim 1, wherein the hierarchical structure comprises at least one of reusable and consumable resources.

6. The system of claim 1, wherein the task for the HTN plan comprises a primitive task.

7. The system of claim 1, wherein the processor is configured to generate a confirmation signal to request confirmation after generating the task from the HTN plan.

8. A method for operating voice-controlled planning control in a system, comprising:
- receiving voice commands via a microphone;
- transforming, via a processor, the voice commands to digital data;
- a memory, operatively coupled to the processor;
- receiving, via a communications interface, at least a portion of a Hierarchical Task Network (HTN) plan comprising device feedback and sensor data, wherein the HTN plan comprises operators having primitive tasks and compound tasks subjected to configured constraints;
- generating, via the processor, a task from the received HTN plan and determining if a voice command confirmation was received in response to the generated task,
- generating, via the processor, a subsequent task from the HTN plan if the voice command confirmation is received via the microphone, and
- executing, via the processor, a repair process on the HTN plan via an orchestration algorithm if the voice command confirmation is not received.

9. The method of claim 8, further comprising executing, via the processor, a re-plan process on the HTN plan if the voice command confirmation is not received via the microphone, and if a new voice command is received via the microphone.

10. The method of claim 9, further comprising executing a re-plan process by determining one or more solutions relating to a remaining portion of the plan based on a current state.

11. The method of claim 8, wherein the HTN plan comprises a plurality of task resources, configured in a hierarchical structure.

12. The method of claim 8, wherein the hierarchical structure comprises at least one of reusable and consumable resources.

13. The method of claim 8, wherein the task for the HTN plan comprises a primitive task.

14. The method of claim 8, further comprising generating, via the processor, a confirmation signal to request confirmation after generating the task from the HTN plan.

15. A system for voice-controlled planning control, comprising:
- a processor;
- a system command manager for processing voice commands;
- a communications interface, operatively coupled to the processor;
- a system planning manager for generating a Hierarchical Task Network (HTN) plan comprising device feedback and sensor data, wherein the HTN plan comprises operators having primitive tasks and compound tasks subjected to configured constraints, wherein the system planning manager is configured to transmit at least a portion of the HTN plan to a processing device via the communications interface;
- wherein the system planning manager is configured to
  - generate a task from the received HTN plan and determine if a voice command confirmation was received from the processing device in response to the generated task,
  - generate a subsequent task from the HTN plan if the voice command confirmation is received from the processing device, and
  - execute a repair process on the HTN plan via an orchestration algorithm if the voice command confirmation is not received.

16. The system of claim 15, wherein the system planning manager is configured to execute a re-plan process on the HTN plan if the voice command confirmation is not received, and if a new voice command is received.

17. The system of claim 16, wherein the system planning manager is configured to execute the re-plan process by determining one or more solutions relating to a remaining portion of the plan based on a current state.

18. The system of claim 15, wherein the HTN plan comprises a plurality of task resources, configured in a hierarchical structure.

19. The system of claim 15, wherein the hierarchical structure comprises at least one of reusable and consumable resources.

20. The system of claim 15, wherein the task for the HTN plan comprises a primitive task.

* * * * *